US012768768B2

(12) United States Patent
Schmidt

(10) Patent No.: US 12,768,768 B2
(45) Date of Patent: Oct. 20, 2026

(54) HIGH-EFFICIENCY OPTICAL DETECTION OF PARTICLES IN MICRO-CAPILLARIES

(71) Applicant: The Regents of the University of California, Oakland, CA (US)

(72) Inventor: Holger Schmidt, Capitola, CA (US)

(73) Assignee: The Regents of the University of California, Oakland, CA (US)

( * ) Notice: Subject to any disclaimer, the term of this patent is extended or adjusted under 35 U.S.C. 154(b) by 439 days.

(21) Appl. No.: 18/094,482

(22) Filed: Jan. 9, 2023

(65) Prior Publication Data

US 2023/0236108 A1 Jul. 27, 2023

Related U.S. Application Data

(63) Continuation of application No. 16/486,797, filed as application No. PCT/US2018/018648 on Feb. 19, 2018, now Pat. No. 11,549,881.

(Continued)

(51) Int. Cl.
*G01N 15/1434* (2024.01)
*G01N 15/00* (2024.01)

(Continued)

(52) U.S. Cl.
CPC ..... *G01N 15/1436* (2013.01); *G01N 15/1459* (2013.01); *G01N 15/1484* (2013.01);

(Continued)

(58) Field of Classification Search
None
See application file for complete search history.

(56) References Cited

U.S. PATENT DOCUMENTS 4,002,998 A 1/1977 Conwell et al.
4,324,492 A 4/1982 Drenckhan et al.

(Continued)

FOREIGN PATENT DOCUMENTS

CN 1488763 A 4/2004
CN 101271070 A 9/2008

(Continued)

OTHER PUBLICATIONS

"Particle." Merriam-Webster.com Dictionary, Merriam-Webster, https://www.merriam-webster.com/dictionary/particle. Accessed May 1, 2025. (Year: 2025).*

(Continued)

*Primary Examiner* — Brittany I Fisher
(74) *Attorney, Agent, or Firm* — Carter, DeLuca & Farrell LLP; Vadim Vapnyar

(57) ABSTRACT

Disclosed herein are systems, methods, and techniques for optical detection of analytes (e.g., biomarkers or other objects) using a liquid-core waveguide in which the analytes are suspended in a high-index liquid inside a liquid channel of the waveguide. The term "high-index" may indicate a refractive core index of the carrier liquid that is higher than or equal to that of one or more surrounding cladding layer(s) (e.g., ethylene glycol liquid inside a glass channel). In some embodiments, a method includes illuminating, by a light-source, one or more particles in a liquid-core waveguide, wherein the liquid-core waveguide comprises a first cladding layer having a first index of a refraction, and a hollow core comprising a liquid inside the hollow core, wherein the liquid has a second index of refraction higher than the first index of refraction; and detecting, by a detector, light emitted from the one or more particles.

23 Claims, 11 Drawing Sheets

600

Related U.S. Application Data

(60) Provisional application No. 62/461,166, filed on Feb. 20, 2017.

(51) Int. Cl.
*G01N 15/14* (2024.01)
*G01N 21/03* (2006.01)
*G01N 21/05* (2006.01)
*G01N 21/64* (2006.01)
*G02B 6/032* (2006.01)

(52) U.S. Cl.
CPC ..... *G02B 6/032* (2013.01); *G01N 2015/0053* (2013.01); *G02B 2006/0325* (2013.01)

(56) References Cited

U.S. PATENT DOCUMENTS 4,640,592 A * 2/1987 Nishimura ............ G02F 1/0147 385/125
6,020,207 A 2/2000 Liu
6,141,367 A 10/2000 Fan et al.
6,192,168 B1 2/2001 Feldstein et al.
6,198,869 B1 3/2001 Kraus et al.
6,337,740 B1 1/2002 Parce
6,771,847 B2 8/2004 Mukai
6,808,075 B2 10/2004 Bohm et al.
6,899,849 B2 5/2005 Meinhart et al.
7,040,338 B2 5/2006 Unger et al.
7,129,048 B2 10/2006 Bruchez et al.
7,149,396 B2 12/2006 Schmidt et al.
7,175,811 B2 2/2007 Bach et al.
7,211,444 B2 5/2007 Fagan
7,251,026 B2 7/2007 Gilby
7,306,672 B2 12/2007 Hansen et al.
7,343,074 B1 3/2008 Gallagher et al.
7,384,923 B2 6/2008 Gregoriadis
7,385,460 B1 6/2008 Wang et al.
7,391,949 B2 6/2008 Schmidt et al.
7,497,997 B2 3/2009 Glezer et al.
7,574,076 B2 8/2009 Mueth et al.
7,731,826 B2 6/2010 Hibbs et al.
7,746,466 B2 6/2010 Godin et al.
7,830,926 B1 11/2010 Kim
7,995,890 B2 8/2011 Schmidt et al.
8,005,332 B2 8/2011 Schmidt et al.
8,270,781 B2 9/2012 Lo et al.
8,279,445 B2 10/2012 Dominguez Horna et al.
8,538,207 B2 9/2013 Gates et al.
8,552,363 B2 10/2013 Erickson et al.
8,792,103 B2 7/2014 Ymeti et al.
8,859,267 B2 10/2014 Seyama et al.
8,986,928 B2 3/2015 Turner et al.
9,134,221 B2 9/2015 Lo et al.
9,164,024 B2 10/2015 Schmidt et al.
9,176,072 B2 11/2015 Zhao et al.
9,222,885 B2 12/2015 Sacko et al.
9,267,891 B2 2/2016 Schmidt et al.
9,515,159 B2 12/2016 Bischopink et al.
9,535,003 B2 1/2017 Nishio et al.
9,551,667 B2 1/2017 Schmidt et al.
9,566,558 B2 2/2017 Viovy et al.
9,983,191 B2 5/2018 Morin
10,222,318 B2 3/2019 Faez et al.
10,281,389 B2 5/2019 Weidlich et al.
10,670,590 B2 6/2020 Morin et al.
10,816,550 B2 10/2020 Cho et al.
10,875,020 B2 12/2020 Schmidt
11,204,348 B2 12/2021 Shin
11,303,089 B2 4/2022 Schmidt
11,549,881 B2 1/2023 Schmidt
11,717,828 B2 8/2023 Schmidt et al.
2004/0252957 A1* 12/2004 Schmidt ............... G01N 21/645 385/131
2005/0142565 A1 6/2005 Samper et al.
2006/0171654 A1 8/2006 Hawkins et al.
2006/0171846 A1 8/2006 Marr et al.
2006/0177350 A1 8/2006 Sano et al.
2006/0194206 A1 8/2006 Persson et al.
2006/0231419 A1 10/2006 Barth et al.
2006/0251371 A1* 11/2006 Schmidt ............. G01N 21/6454 385/129
2008/0057594 A1 3/2008 Fagan
2008/0254995 A1 10/2008 Kim et al.
2009/0032730 A1* 2/2009 Erickson ............ G02B 6/02347 250/435
2009/0165876 A1 7/2009 Atkin et al.
2009/0218514 A1 9/2009 Klunder et al.
2010/0051788 A1 3/2010 Klunder et al.
2011/0267612 A1* 11/2011 Roberts .............. G02B 6/02328 385/124
2012/0040470 A1 2/2012 Dorn et al.
2012/0214707 A1 8/2012 Ymeti et al.
2012/0312083 A1 12/2012 Akahori et al.
2014/0313510 A1 10/2014 Schmidt et al.
2015/0042998 A1* 2/2015 Kontani ............... G01N 21/553 356/445
2015/0260649 A1 9/2015 Nishio
2015/0268244 A1 9/2015 Cho
2016/0246009 A1 8/2016 Jiang
2020/0011795 A1 1/2020 Schmidt et al.
2020/0284783 A1 9/2020 Schmidt et al.

FOREIGN PATENT DOCUMENTS

DE 102013015016 A1 9/2014
EP 0393196 A1 10/1990
EP 0414430 A1 2/1991
JP H0470607 A 3/1992
JP H0727927 A 1/1995
JP 2521618 B2 8/1996
JP 2958060 B2 10/1999
JP 2004077305 A 3/2004
JP 2004191944 A 7/2004
JP 2004529349 A 9/2004
JP 2005141009 A 6/2005
JP 2008536129 A 9/2008
JP 2009063601 A 3/2009
JP 2010519557 A 6/2010
JP 2013088367 A 5/2013
JP 2016503489 A 2/2016
WO 02088686 A1 11/2002
WO 02099472 A2 12/2002
WO 2004040319 A1 5/2004
WO 2006110749 A2 10/2006
WO 2010/045357 A2 4/2010
WO 2013058084 A1 4/2013
WO 2014062719 A2 4/2014
WO 2016038015 A1 3/2016
WO 2016038108 A1 3/2016
WO 2016123719 A1 8/2016

OTHER PUBLICATIONS

European Examination Report dated Nov. 3, 2021 issued in corresponding EP Appln. No. 18 708 299.5.

Chien-Hsin, Chen et al, A Multi-D-Shaped Optical Fiber for Refractive Index Sensing, Sensors, vol. 10, No. 5, May 11, 2010, pp. 4794-4804, doi:10.3390/s100504794 (Year: 2010).

Risk et al.; "Optical waveguides with an aqueous core and a low-index nanoporous cladding"; Optics Express; vol. 12; Dec. 2004; p. 6446-6455.

Yin et al.; "Integrated optical waveguides with liquid cores"; Applied Physics Letters; vol. 85; Oct. 2004; p. 3477-3479.

International Patent Application No. PCT/US2018/018648; Int'l Search Report and the Written Opinion; dated May 2, 2018; 14 pages.

Balslev, S. et al., "Lab-on-a-chip with integrated optical transducers", The Royal Society of Chemistry, Dec. 22, 2005, vol. 2006, pp. 213-217.

(56) References Cited

OTHER PUBLICATIONS

Damla Ozcelik, "Optofluidic Devices for Biomolecule Sensing and Multiplexing", UC Santa Cruz Electronic Theses and Dissertations, US, University of California Santa Cruz, Dec. 2016, pp. 1-230.

* cited by examiner

HIGH-EFFICIENCY OPTICAL DETECTION OF PARTICLES IN MICRO-CAPILLARIES

CROSS REFERENCE TO RELATED APPLICATIONS

This application is a continuation of U.S. patent application Ser. No. 16/486,797, filed on Aug. 16, 2019, now U.S. Pat. No. 11,549,881, which is a U.S. National Stage Application filed under 35 U.S.C. § 371 (a) of International Application No. PCT/US2018/018648, filed on Feb. 19, 2018, titled "HIGH EFFICIENCY OPTICAL DETECTION OF BIOMOLECULES IN MICRO-CAPILLARIES," which claims priority to U.S. provisional patent application No. 62/461,166, filed on Feb. 20, 2017, titled "METHOD FOR HIGH-EFFICIENCY OPTICAL DETECTION OF BIOMOLECULES IN MICRO-CAPILLARIES". The entire disclosures of the foregoing applications are incorporated by reference herein.

TECHNICAL FIELD

The present disclosure relates generally to optofluidics, and more particularly to capture and detection of generated light for optical detection of biomarkers and other objects.

BACKGROUND

One known method of optical detection of biological samples (e.g., molecules, particles, biomarkers, nucleic acids, proteins, etc.) is surface-based excitation/detection using evanescent fields from solid waveguides. Another known method is excitation/detection inside a microchannel/micro-capillary filled with water, saline, or a buffer solution containing the particles to be detected.

Another known solution is to use ARROW (antiresonant reflecting optical waveguides) or Bragg waveguides, which confine light in low-index materials by using wave interference from specially designed cladding layers. These waveguides have been shown to guide light through microchannels with low propagation loss, and can be interfaced with solid-core waveguides to enable sensitive detection of biomarkers down to the single nucleic acid level.

SUMMARY

As described above, known methods for optical detection of biological samples include surface-based excitation/detection using evanescent fields from solid waveguides; excitation/detection inside a microchannel/micro-capillary filled with water, saline, or a buffer solution; and use ARROW or Bragg waveguides to which confine light in low-index materials by using wave interference from specially designed cladding layers. However, all of these known methods have drawbacks.

For example, surface-based excitation/detection using evanescent fields from solid waveguides is extremely optically inefficient, requires target transport and binding to a surface, and has a very limited dynamic range. Excitation/detection inside a fluid-filled microchannel is difficult because biological liquids such as water, saline solutions, and buffer solutions, have a refractive index that is lower than that of solid-state materials that make up the channel.

Using ARROW or Bragg waveguides offers superior performance to the other methods described above, but has other drawbacks and limitations, including incomplete detection of the target molecules and analytes, and producing detection signal-to-noise ratio (SNR) close to the detector background, making it very challenging to detect targets that are labeled with only a single or few fluorescent dyes.

The main reason behind these limits lies in the nature of the leaky-mode waveguiding principle and is illustrated in FIGS. 1A and 1B. FIG. 1A shows a cross-sectional view of a liquid-core waveguide 100 wherein the index of refraction of the liquid-core 102 is lower than the index of refraction of the cladding 104. FIG. 1B shows the electric field profile 110 for a fundamental optical mode confined in a low-index medium of liquid-core waveguide 100 using ARROW/Bragg confinement.

As shown in FIG. 1B, the field decreases from a maximum 112 in the core center to exactly zero at the interfaces 114*a* and 114*b* with the cladding. Because the field is zero at the channel walls, particles in the low-index medium of liquid-core waveguide 100 that are located near the channel wall are excited and detected inefficiently, or are not excited or detected at all, as any fluorescence cannot couple into the waveguide mode. This effect can also be seen in the depiction of the mode in FIG. 1A, which shows that the brightest portion of the mode is confined to the center of liquid-core 102, and that the mode is very weak near the interfaces of liquid-core 102 and cladding 104. This results in a reduction of the detectable number of analyte particles in the digital detection regime, as only those particles located away from the walls of the liquid-core can be detected.

Secondly, leaky-mode waveguiding can occur with low, but always finite (e.g., non-zero) loss. This means that generated optical fluorescence or scattering signals can only be transported along the waveguide with finite efficiency. This further exacerbates the challenge of detecting particles close to the walls of a low-index medium liquid-core waveguide.

Thus, optical detection of biological samples (e.g., molecules, particles, biomarkers, nucleic acids, proteins, etc.) with high sensitivity on a chip using optical waveguides is difficult in accordance with known methods. Therefore, improved methods for optical detection of biological samples with high sensitivity on a chip using optical waveguides are needed. In particular, there is a need for methods that enable improved detection of the target molecules and analytes, particularly those particles located near channel walls of liquid-core waveguides, and that enable improved detection of targets that are labeled with only a single or few fluorescent dyes.

Disclosed herein are systems, methods, and techniques for improved optical detection of biomarkers and other objects using a liquid-core waveguide that may overcome the drawbacks of known methods discussed above and that may address the needs discussed above. The systems, methods, and techniques disclosed herein may enable improved capture of generated light and its transport to a photodetector.

In some embodiments, a liquid-core waveguide comprises a liquid core having a higher index of refraction than the index of refraction of the cladding. This may enable a fundamental optical mode to have a non-zero field strength at the interfaces between the liquid core and the cladding, and may therefore enable efficient excitation and detection of particles located proximate to the interfaces in the liquid core.

In some embodiments, a liquid-core waveguide comprises a liquid core, an inner cladding layer, and an outer cladding layer. By matching the index of refraction of the liquid core to the index of refraction of the inner cladding layer, and by selecting an outer cladding layer having a lower index of refraction than both the inner cladding layer and the liquid core, a fundamental optical mode may have a non-zero field strength at the interfaces between the liquid core and the inner cladding layer, and may therefore enable efficient excitation and detection of particles located proximate to the interfaces in the liquid core.

In some embodiments, a method for particle detection is provided, the method comprising: illuminating, by a light-source, one or more particles in a liquid-core waveguide, wherein the liquid-core waveguide comprises: a first cladding layer having a first index of a refraction; and a hollow core extending through the waveguide and comprising a liquid inside the hollow core, wherein the liquid has a second index of refraction higher than the first index of refraction; and detecting, by a detector, light emitted from the one or more particles.

In some embodiments of the method, the method further comprises introducing the one or more particles into the liquid prior to illuminating the one or more particles.

In some embodiments of the method, the method further comprises introducing the liquid into the hollow core prior to illuminating the one or more particles.

In some embodiments of the method, the first index of refraction is less than or equal to 2, 1.8, 1.6, or 1.4.

In some embodiments of the method, the second index of refraction is greater than or equal to 2, 1.8, 1.6, or 1.4.

In some embodiments of the method, the waveguide is configured to transmit light from the light source via total internal reflection.

In some embodiments of the method, the waveguide is configured to support a fundamental transverse electromagnetic mode of light from the light source.

In some embodiments of the method, the waveguide is configured such that an intensity of the fundamental transverse electromagnetic mode has a non-zero value at an interface between the first cladding layer and the hollow core.

In some embodiments of the method, the waveguide is configured such that an intensity of the fundamental transverse electromagnetic mode at an interface between the first cladding layer and the hollow core is greater than or equal to 20%, 30%, 40%, 50%, 60%, 70%, 80%, 90%, or 99% of a maximum intensity of the fundamental transverse electric mode.

In some embodiments of the method, the hollow core is less than or equal to 20 μm, 10 μm, 5 μm, or 1 μm in width.

In some embodiments of the method, the first cladding layer is less than or equal to 10 μm, 5 μm, 1 μm, 0.5 μm, or 0.1 μm in thickness.

In some embodiments of the method, the first cladding layer comprises one or more of silicon dioxide, tantalum pentoxide, or silicon nitride, PDMS, or one or more plastics.

In some embodiments of the method, the liquid-core waveguide is disposed on a substrate less than or equal to 2 cm, 1 cm, 5 mm, or 2 mm in width and less than or equal to 2 cm, 1 cm, 5 mm, or 2 mm in length.

In some embodiments of the method, the light source is disposed on the substrate.

In some embodiments of the method, the detector is disposed on the substrate.

In some embodiments of the method, the liquid comprises one or more of zinc iodide, ethylene glycol, or sodium iodide.

In some embodiments of the method, the one or more particles comprise one or more of molecules, particles, biomarkers, nucleic acids, proteins, and DNA.

In some embodiments of the method, the liquid-core waveguide comprises: a second cladding layer between the first cladding layer and the hollow core, wherein the second cladding layer has a third index of refraction that is the same as the second index of refraction or is within +/−10%, +/−5%, +/−2%, +/−1%, +/−0.5%, +/−0.1%, or +/−0.01% of the second index of refraction.

In some embodiments of the method, the waveguide is configured such that an intensity of the fundamental transverse electromagnetic mode at an interface between the second cladding layer and the hollow core is greater than or equal to 20%, 30%, 40%, 50%, 60%, 70%, 80%, 90%, or 99% of a maximum intensity of the fundamental transverse electric mode.

In some embodiments of the method, the second cladding layer is less than or equal to 1 μm, 0.5 μm, or 0.1 μm in thickness.

In some embodiments of the method, the second cladding layer comprises one or more of silicon dioxide, tantalum pentoxide, silicon nitride, PDMS, or plastic.

In some embodiments of the method, the method further comprises identifying one or more of the detected particles on the basis of a detected characteristic.

In some embodiments, a particle detection system is provided, the system comprising: a light source configured to excite one or more particles; a liquid-core waveguide comprising: a first cladding layer having a first index of refraction; and a hollow core extending through the waveguide and comprising a liquid inside the hollow core, wherein: the liquid has a second index of refraction higher than the first index of refraction; and the liquid comprises the one or more particles; and a detector configured to detect light emitted from the one or more particles.

In some embodiments of the system, the system further comprises a second cladding layer between the first cladding layer and the hollow core, wherein the second cladding layer has a third index of refraction that is the same as the second index of refraction or is within +/−10%, +/−5%, +/−1%, +/−0.5%, +/−0.1%, or +/−0.01% of the second index of refraction.

In some embodiments of the system, the liquid-core waveguide is disposed on a substrate less than or equal to 2 cm, 1 cm, 5 mm, or 2 mm in width and less than or equal to 2 cm, 1 cm, 5 mm, or 2 mm in length.

In some embodiments of the system, the light source is disposed on the substrate.

In some embodiments of the system, the detector is disposed on the substrate.

DETAILED DESCRIPTION OF ILLUSTRATIVE EMBODIMENTS

Disclosed herein are systems, methods, and techniques for improved optical detection of biomarkers and other objects using a liquid-core waveguide that may overcome the drawbacks of known methods discussed above and that may address the needs discussed above. The systems, methods, and techniques disclosed herein may enable improved capture of generated light and its transport to a photodetector. As described, target detection in high-index liquids in accordance with the techniques and systems herein may solve the main challenges limiting chip-based detection of biological targets on the single analyte limit.

In some embodiments, the waveguides described herein may be referred to as "high-index liquid-core waveguides." The term "high-index," as used herein, may refer to a liquid-core waveguide in which a refractive core index of the carrier liquid is higher than that of the surrounding cladding layer(s) (e.g., ethylene glycol liquid inside a glass channel). The term "high-index," as used herein, may also be used to refer to the liquid contained in such a liquid-core waveguide (e.g., ethylene glycol liquid may be referred to as a "high-index liquid" in the context of its use in a liquid core waveguide with cladding layer(s) of a lower index of refraction that the index of refraction of the ethylene glycol liquid).

In some embodiments, a liquid-core waveguide comprises a liquid core having a higher index of refraction than the index of refraction of the cladding. This may enable a fundamental optical mode to have a non-zero field strength at the interfaces between the liquid core and the cladding, and may therefore enable efficient excitation and detection of particles located proximate to the interfaces in the liquid core.

As described herein, the effect of employing high-index liquid core waveguides may be to cause the liquid-core waveguide to function in a manner similar to a conventional optical waveguide in which light is guided via total internal reflection. The results of this approach are shown, in one example, in FIGS. 2A and 2B.

Figures 1A, 1B, 2A, 2B:
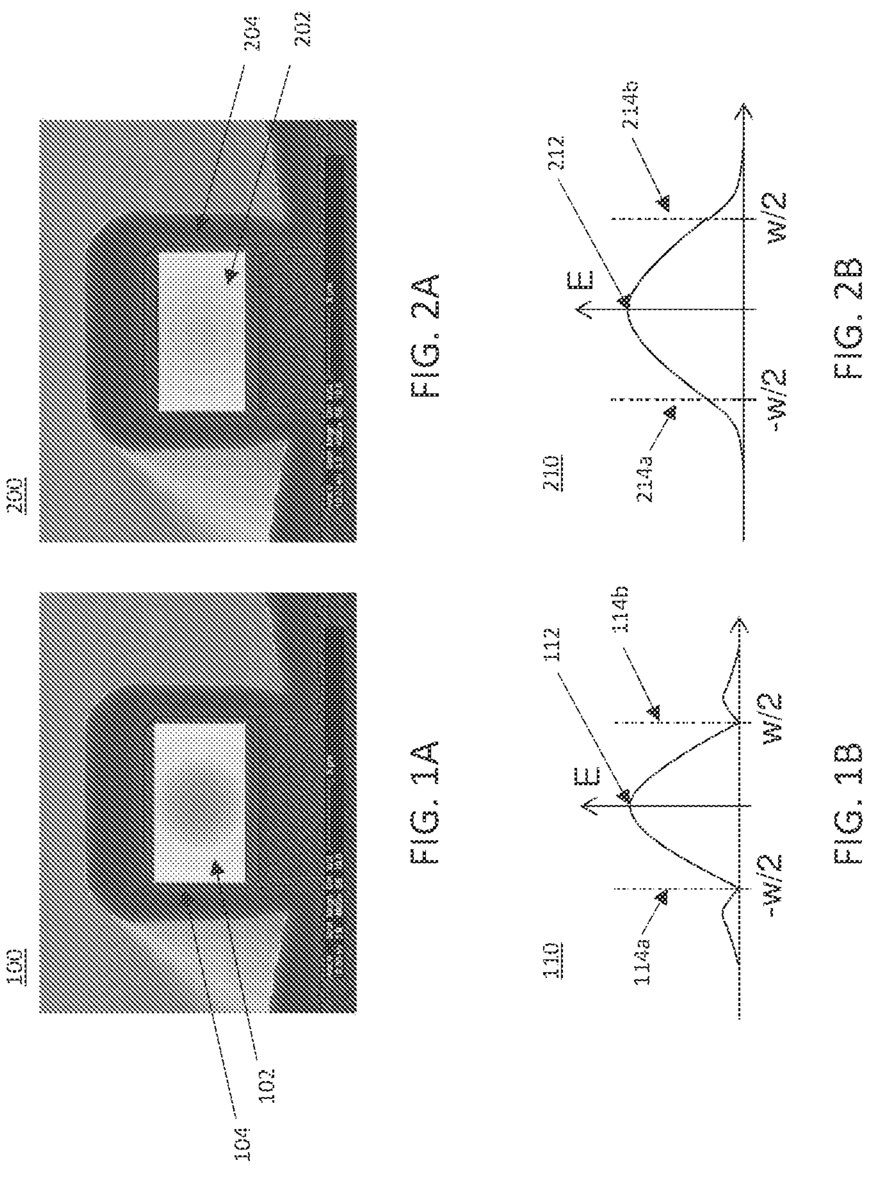
FIG. 1A shows a cross-sectional view of a liquid-core waveguide wherein the index of refraction of the liquid-core is lower than the index of refraction of the cladding.
FIG. 1B shows the electric field profile for a fundamental optical mode confined in a low-index medium of liquid-core waveguide using ARROW/Bragg confinement.
FIG. 2A shows a cross-sectional view of a liquid-core waveguide wherein the index of refraction of the liquid-core is higher than the index of refraction of the cladding, in accordance with some embodiments.
FIG. 2B shows the electric field profile for a fundamental optical mode in a high-index liquid-core waveguide, in accordance with some embodiments.

FIG. 2A shows a cross-sectional view of a liquid-core waveguide 200, in accordance with some embodiments. In some embodiments, the index of refraction of the liquid-core is higher than the index of refraction of the cladding.

The index of refraction of the liquid core 202 may be an index of refraction of a fluid that fills all or part of the liquid core, which may in some embodiments include zinc iodide liquid, ethylene glycol liquid, sodium iodide solutions, or any other suitable liquid having an index of refraction that is greater than an index of refraction of cladding 204, including, for example:

- zinc iodide dissolved in water;
- sodium iodide dissolved in water;
- ZnCl2 dissolved in water;
- ionic liquids, such as (cation/anion):
  - (1-Et-3-Me-Im-N)/$(SO_2F)_2$)
  - (1-Et-3-Me-Im-N/$(CN)_2$);
  - (1-Et-3-Me-Im/TCB);
  - (1-Et-3-Me-Im/SCN);
  - (1-Et-3-Me-Im/$SO_3OH$);
  - (1-Et-3-Me-Im/$SO_3CH_3$);
  - (Et-Py-N/$(SO_2F)_2$); and/or
  - (He-Py-N/$(SO_2F)_2$);
- other ionic liquids, such as:
  - choline dihydrogen phosphate; and/or
  - deep eutectic solvent;
- ethylene glycol
- organic liquids, such as:
  - benzyl benzoate;
  - 2-bromethyl benzene;
  - DMSO;
  - 1,1,2,2-tetrabromoethane;
  - 1,1,2,2-tetrachloroethane; and/or
  - Tetrachloroethylene; and/or
- aqueous solutions, such as:
  - $AgNO_3$;
  - $CdCl_2$;
  - KBr+HgBr;
  - $Hg(NO_3)_2$:$H_2O$+$HgBr_2$; and/or
  - $Hg(NO_3)_2$:$H_2O$+$HgI_2$.

In some embodiments, the index of refraction of liquid core 202 may be greater than or equal to 1.25, 1.33, 1.5, 1.75, 2.0, or 2.25. In some embodiments, the index of refraction of liquid core 202 may be less than or equal to 1.25, 1.33, 1.5, 1.75, 2.0, or 2.25. In some embodiments, the index of refraction of liquid core 202 may be between 1.33 and 2.0.

The index of refraction of cladding 204 may be an index of refraction of a solid (and/or flexible) material used to create the cladding, which may in some embodiments include PDMS, one or more plastic, silicon dioxide, tantalum pentoxide, silicon nitride, or any suitable glass and/or oxide. In some embodiments, the index of refraction of cladding 204 may be less than or equal to 1.2, 1.3, 1.4, 1.5, 1.6, 1.7, or 1.8. In some embodiments, the index of refraction of cladding 204 may be greater than or equal to 1.2, 1.3, 1.4, 1.5, 1.6, 1.7, or 1.8. In some embodiments, the index of refraction of cladding 204 may be between 1.4 and 1.6.

In some embodiments, the width ("w" as shown in FIG. 2B) of liquid-core 202 of liquid-core waveguide 200 may be less than or equal to 0.25 μm, 0.5 μm, 1 μm, 5 μm, 10 μm, 15 μm, 20 μm, 30 μm, or 50 μm. In some embodiments, the width of liquid-core 202 of liquid-core waveguide 200 may be greater than or equal to 0.25 μm, 0.5 μm, 1 μm, 5 μm, 10 μm, 15 μm, 20 μm, 30 μm, or 50 μm. In some embodiments, the width of liquid core 202 may be between 1 μm and 20 μm.

In some embodiments, the height of liquid core 202 may be less than or equal to 0.25 μm, 0.5 μm, 1 μm, 5 μm, 10 μm, 15 μm, or 20 μm. In some embodiments, the height of liquid core 202 may be greater than or equal to 0.25 μm, 0.5 μm, 1 μm, 5 μm, 10 μm, 15 μm, or 20 μm. In some embodiments, the height of liquid core 202 may be between 1 μm and 10 μm.

While liquid core 202 is shown in the example of FIGS. 2A and 2B as rectangular, it may in some embodiments have a square, round, semi-circular, or any suitable cross-sectional shape.

In some embodiments, cladding 204 may have a thickness of less than 0.25 μm, 0.5 μm, 1 μm, 5 μm, 10 μm, 15 μm, or 20 μm. In some embodiments, cladding 204 may have a thickness of greater than 0.25 μm, 0.5 μm, 1 μm, 5 μm, 10 μm, 15 μm, or 20 μm. In some embodiments, cladding 204 may have a thickness of between 0.01 μm and 10 μm.

FIG. 2B shows the electric field profile for a fundamental optical mode in a high-index liquid-core waveguide, such as waveguide 200, in accordance with some embodiments. As shown, the mode profile has a finite, non-zero strength at interfaces 214*a* and 214*b* between liquid-core 202 and cladding 204, due to the nature of the solutions to the Helmholtz equation. This is distinguishable from the mode shown in FIG. 1B, in which the mode profile is forced to zero at the interface of low-index liquid core 102 and cladding 104. In some embodiments, the mode strength at interface 214*a* and/or 214*b* may be greater than or equal to 1%, 5%, 10%, 20%, 30%, 40%, 50%, 60%, 70%, 80%, 90%, 95%, or 99% of the mode strength at maximum 212 at the center of liquid core 202. In some embodiments, the mode strength at 214*a* and/or 214*b* may be less than or equal to 1%, 5%, 10%, 20%, 30%, 40%, 50%, 60%, 70%, 80%, 90%, 95%, or 99% of the mode strength at maximum 212 at the center of liquid core 202. The value of the field strength of the mode at interfaces 214*a* and/or 214*b* relative to the field strength maximum 212 at the center of liquid core 202 may be controlled via the channel dimensions and the relative indices of the core and cladding materials.

It should be noted that the field profiles shown and discussed herein (both with respect to the example of FIG. 2B and with respect to FIG. 6C) show and refer to field profiles for a lateral dimension (e.g., width-wise across the waveguide) of a fundamental transverse electromagnetic mode. However, it should be noted that fields of modes of light propagating through waveguides as disclosed herein may have the same of similar properties in the vertical dimension (e.g., height-wise across the waveguide) as they do in the lateral dimension.

The effect of the profile of the mode in FIG. 2B can also be seen in the depiction of the mode in FIG. 2A, which shows a more uniform brightness that extends across the entirety of liquid-core 202, as compared to the mode spot in liquid-core 102 that is concentrated only at the center of the liquid core and that is very weak near the channel walls.

Thus, while particles in liquid core 102 near interface 114*a* or 114*b* are not excitable and/or detectable due to the weak mode strength there, particles in liquid core 202 near interface 214*a* or 214*b* may be excitable and detectable because the mode strength there may be substantially stronger due to the mode's extension into cladding 204 and due to the fact that the mode is not forced to zero at interface 214*a* or 214*b*.

In this way, the problem discussed above of incomplete detection of target analytes may be addressed by using a high-index liquid to ensure that analytes are detectable at all parts of a liquid core. Furthermore, the problem discussed above of the difficulty of detecting targets labeled with only a single or few fluorescent dyes may be addressed because total-internal-reflection-guiding waveguides are theoretically lossless, and may therefore be fabricated to be extremely efficient (e.g., essentially lossless) in practice. In practice, the only losses may be due to fabrication imperfections, which may be addressed and minimized independently. Thus, transport of light along a channel such as one defined by waveguide 200 may be significantly improved as compared to leaky-mode guiding such as with waveguide 100.

EXAMPLES

Figure 3A:
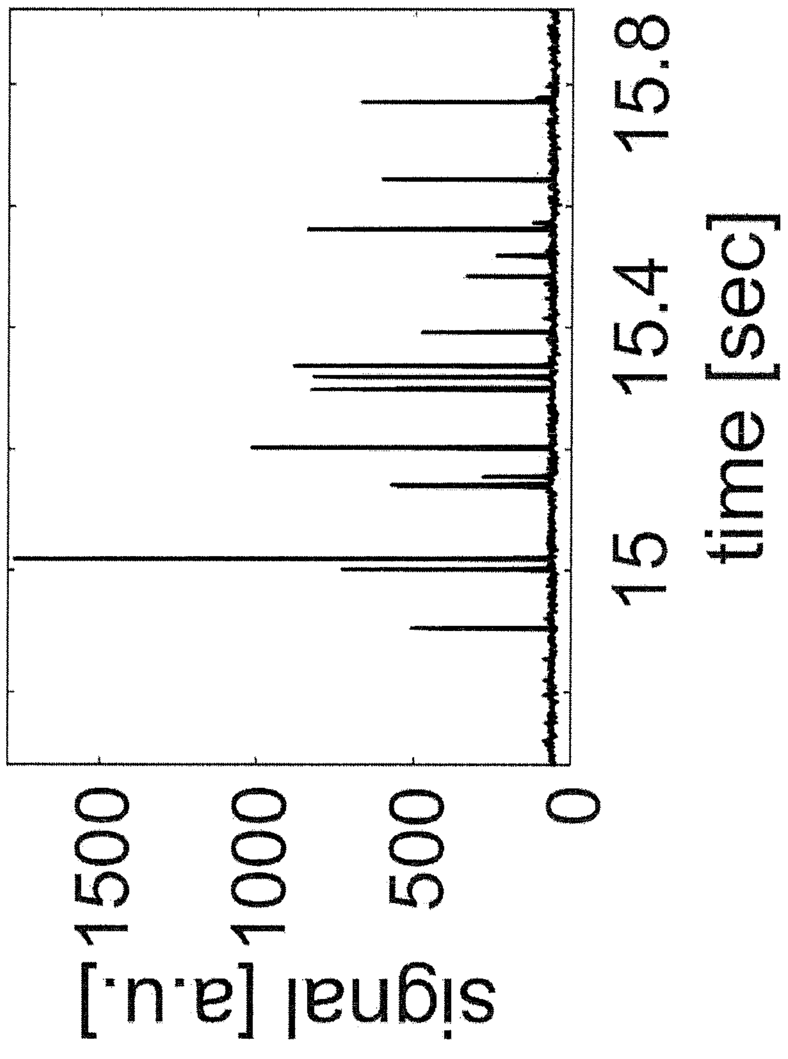
FIG. 3A shows a signal corresponding to detection of fluorescent beads in a liquid-core channel containing zinc iodide, in accordance with some embodiments.
Figure 3B:
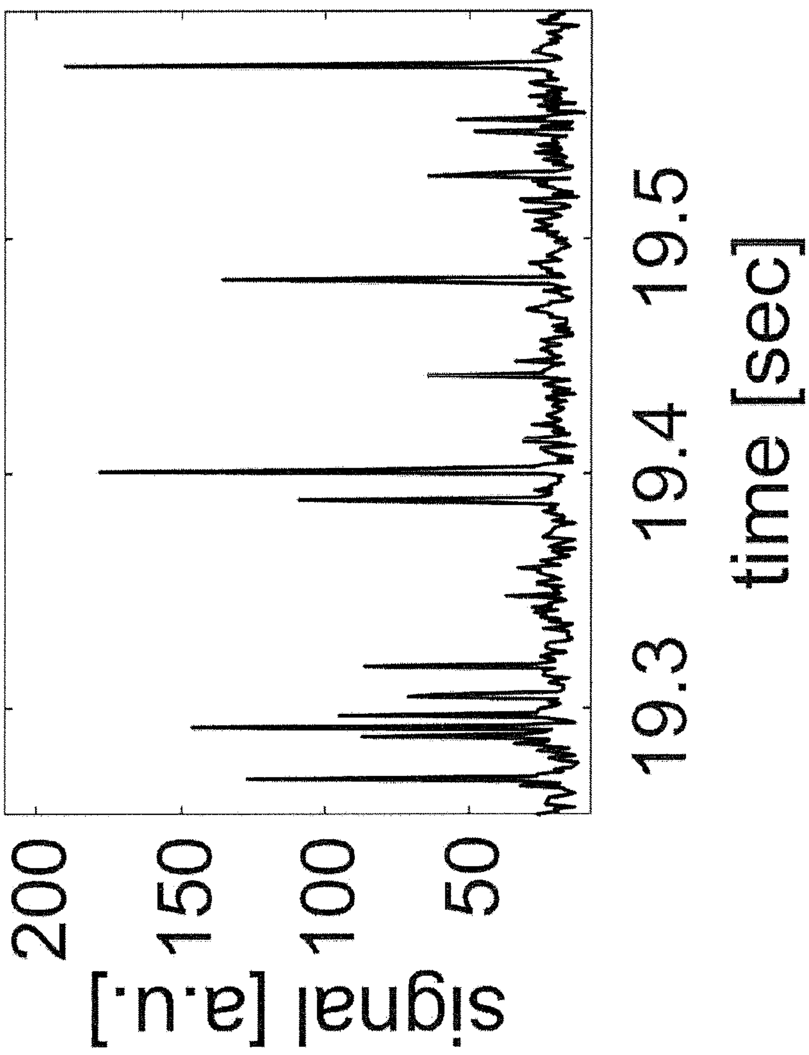
FIG. 3B shows a signal corresponding to detection of fluorescent beads in a liquid-core channel containing water, in accordance with some embodiments.
Figure 3C:
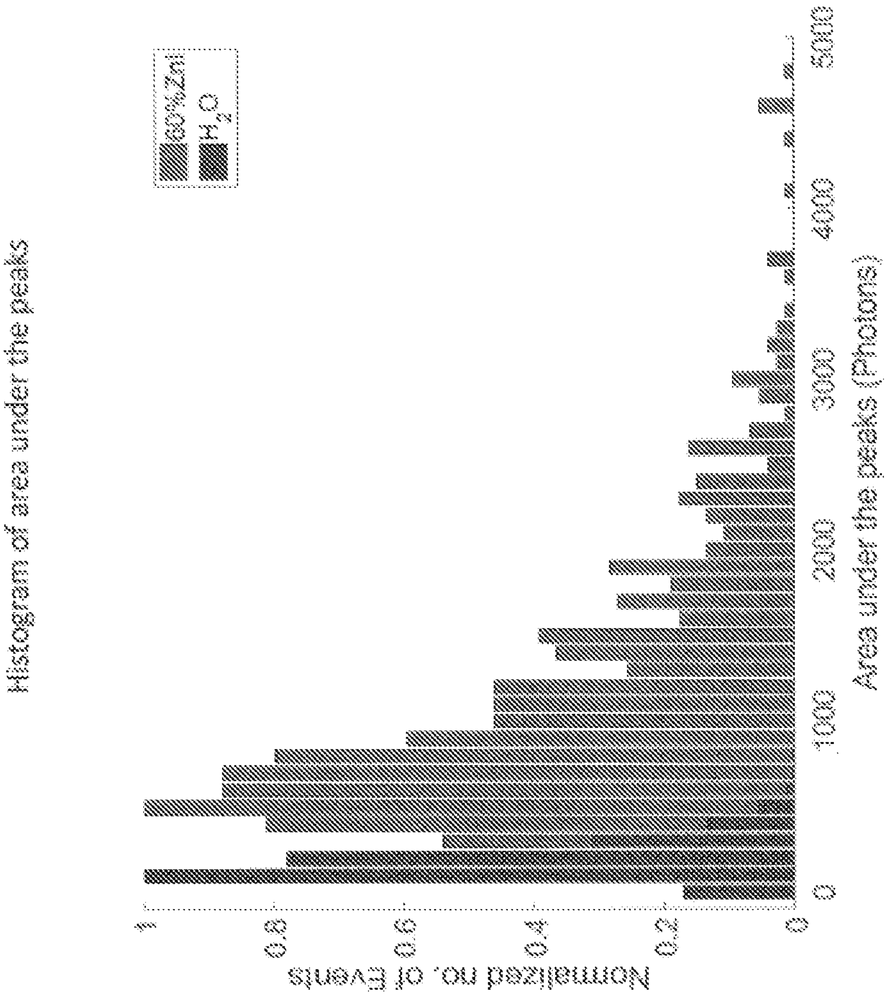
FIG. 3C shows a histogram comparing the area under the peaks of the signal in FIG. 3A and the signal in FIG. 3B, in accordance with some embodiments.

FIGS. 3A-3C show experimental data for emission from 100 nm fluorescent in liquid at a concentration of $10^7$ beads per mL, illuminated by 488 nm light in a liquid-core waveguide. FIG. 3A shows a signal corresponding to detection of the beads in a liquid-core channel containing 60% zinc iodide and 40% $H_2O$, which has an index of refraction of about 1.49 and a viscosity of about 2 cP. FIG. 3B shows a signal corresponding to detection of the beads in a liquid-core channel having ARROW layers on a bottom side and $SiO_2$ layers (having an index of refraction of 1.46) on the other three sides, the channel containing water, which has an index of refraction of about 1.33 and a viscosity of about 1 cP.

As shown in FIGS. 3A and 3B, the emission spikes from the fluorescent beads in the zinc iodide solution (FIG. 3A) were substantially higher than the spikes from the fluorescent beads in water (FIG. 3B). The x-axes in FIGS. 3A and 3B show time in seconds, and the y-axes show photometer counts per 1 ms.

FIG. 3C shows a histogram comparing the area under the peaks of the signal in FIG. 3A and the signal in FIG. 3B. The darker-colored bars at the left of the histogram correspond to the beads in water, while the lighter-colored bars correspond to the beads in the zinc iodide solution.

Table 1 (below) shows data corresponding to the beads in water and to the beads in zinc iodide, as well as ratios comparing the data from each liquid. As shown, beads in the zinc iodide solution showed higher average peak intensity and a higher background signal.

TABLE 1

| | Average Peak (counts/1 ms) | Background (Counts/1 ms) | Signal to Noise Ratio |
|---|---|---|---|
| Water | 115 | 35 | 3.3 |
| 60% zinc iodide | 475 | 85 | 5.6 |
| $ZnI_2$:$H_2O$ | 4.1 | 2.4 | 1.7 |

Figure 4A:
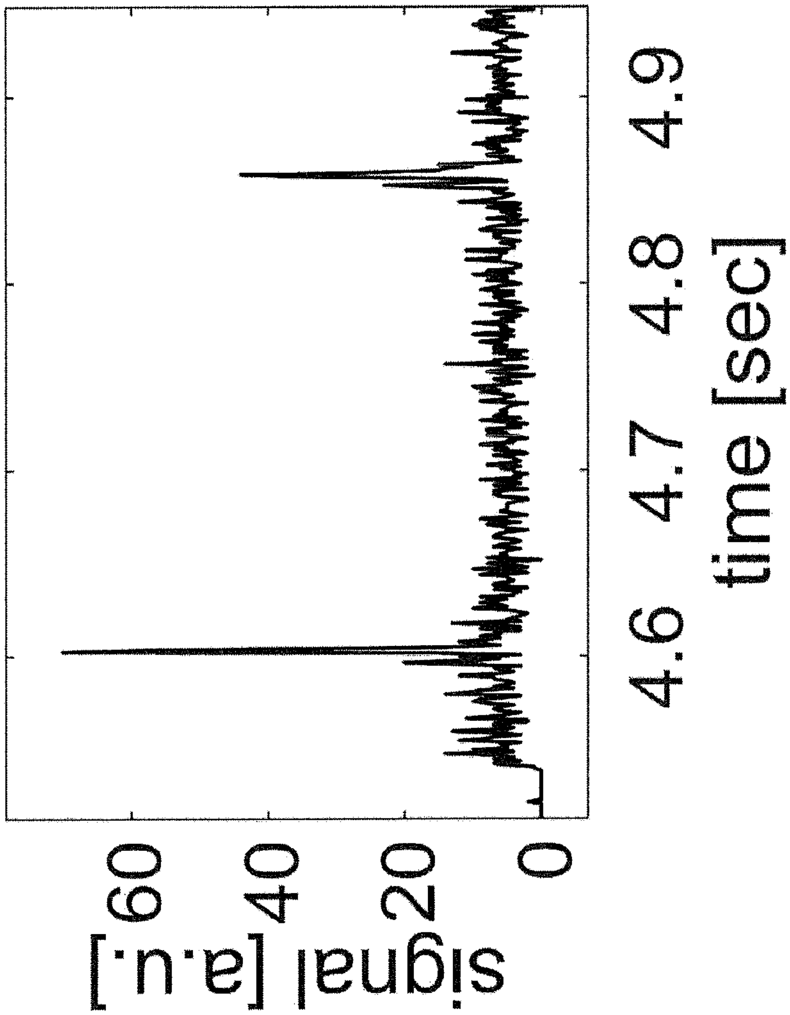
FIG. 4A shows a signal corresponding to detection of fluorescent beads in a liquid-core channel containing ethylene glycol, in accordance with some embodiments.
Figure 4B:
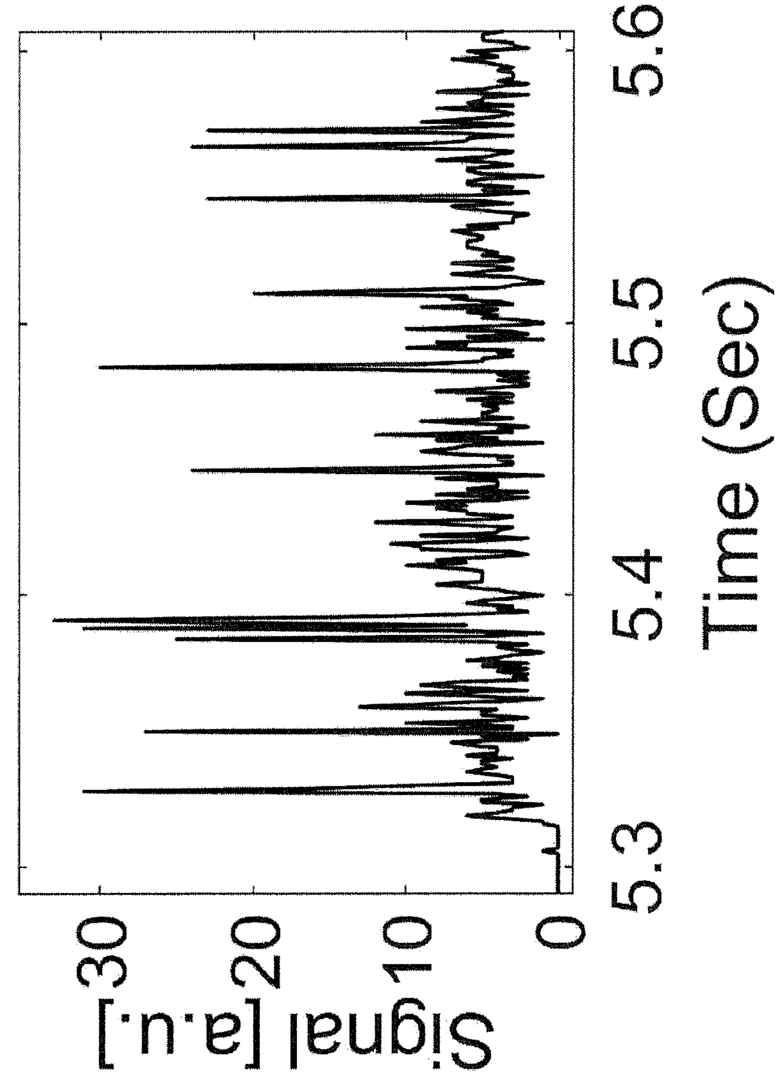
FIG. 4B shows a signal corresponding to detection of fluorescent beads in a liquid-core channel containing water, in accordance with some embodiments.
Figure 4C:
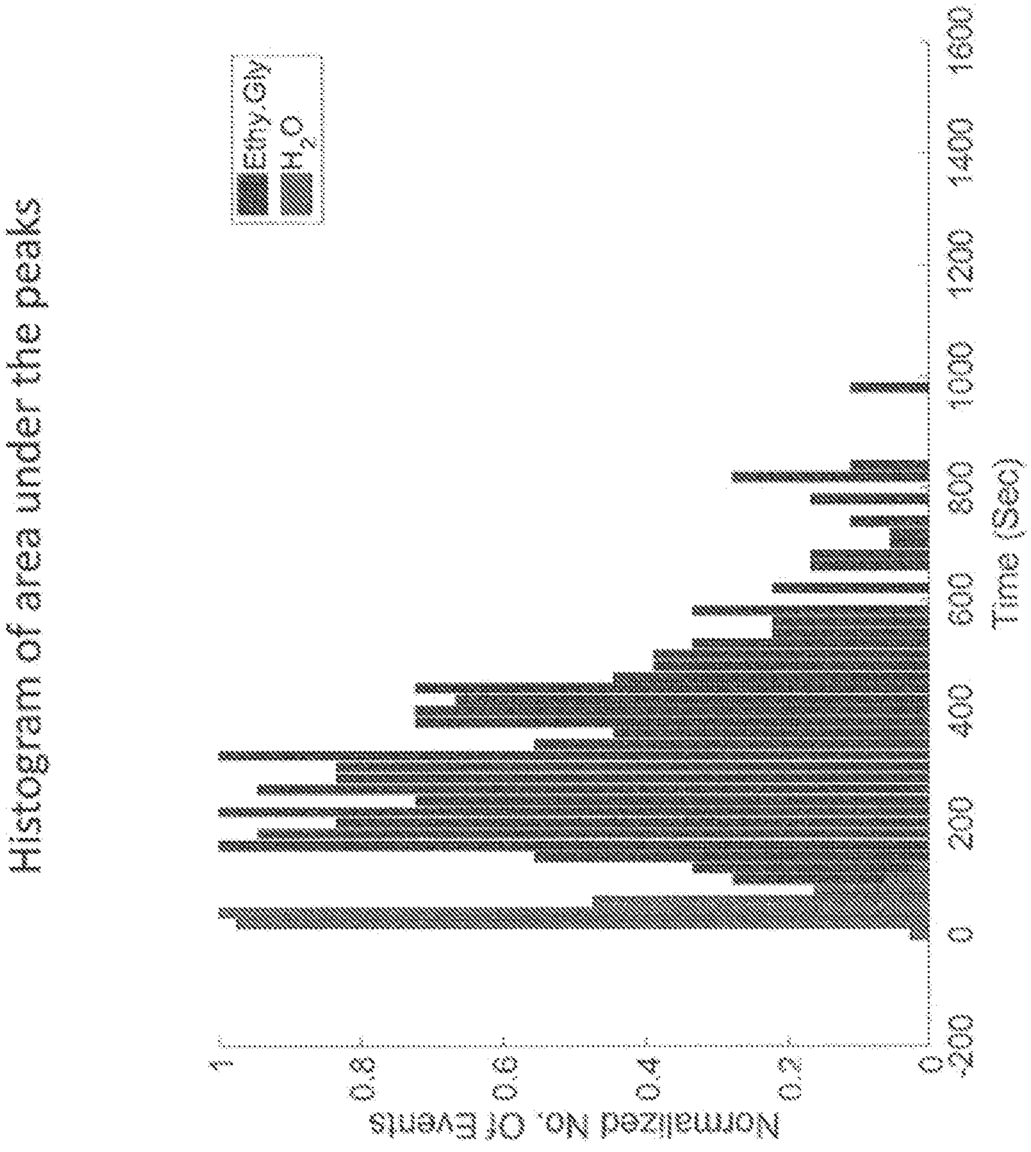
FIG. 4C shows a histogram comparing the area under the peaks of the signal in FIG. 4A and the signal in FIG. 4B, in accordance with some embodiments.

FIGS. 4A-4C show experimental data for emission from 100 nm fluorescent in liquid at a concentration of $10^7$ beads per mL, illuminated by 488 nm light in a liquid-core waveguide. FIG. 4A shows a signal corresponding to detection of the beads in a liquid-core channel containing ethylene glycol liquid, which has an index of refraction of about 1.43 and a viscosity of about 16 cP. FIG. 4B shows a signal corresponding to detection of the beads in a liquid-core channel having ARROW layers on a bottom side and $SiO_2$ layers (having an index of refraction of 1.46) on the other three sides, the channel containing water, which has an index of refraction of about 1.33 and a viscosity of about 1 cP.

As shown in FIGS. 4A and 4B, the emission spikes from the fluorescent beads in the ethylene glycol liquid (FIG. 4A) were substantially higher than the spikes from the fluorescent beads in water (FIG. 4B). The x-axes in FIGS. 4A and 4B show time in seconds, and the y-axes show photometer counts per time.

FIG. 4C shows a histogram comparing the area under the peaks of the signal in FIG. 4A and the signal in FIG. 4B. The lighter-colored bars at the left of the histogram correspond to the beads in water, while the darker-colored bars correspond to the beads in the ethylene glycol liquid.

Table 2 (below) shows data corresponding to the beads in water and to the beads in ethylene glycol liquid, as well as ratios comparing the data from each liquid. As shown, beads in the ethylene glycol liquid showed higher average peak intensity and a similar background signal.

TABLE 2

| | Average Peak (counts/1 ms) | Background (Counts 1/ms) | Signal to Noise Ratio |
|---|---|---|---|
| Water | 23 | 12.1 | 1.9 |
| Ethylene Glycol | 44.3 | 12.6 | 3.5 |
| $(CH_2OH)_2$:$H_2O$ | 1.9 | 1.04 | 1.84 |

Figure 5A:
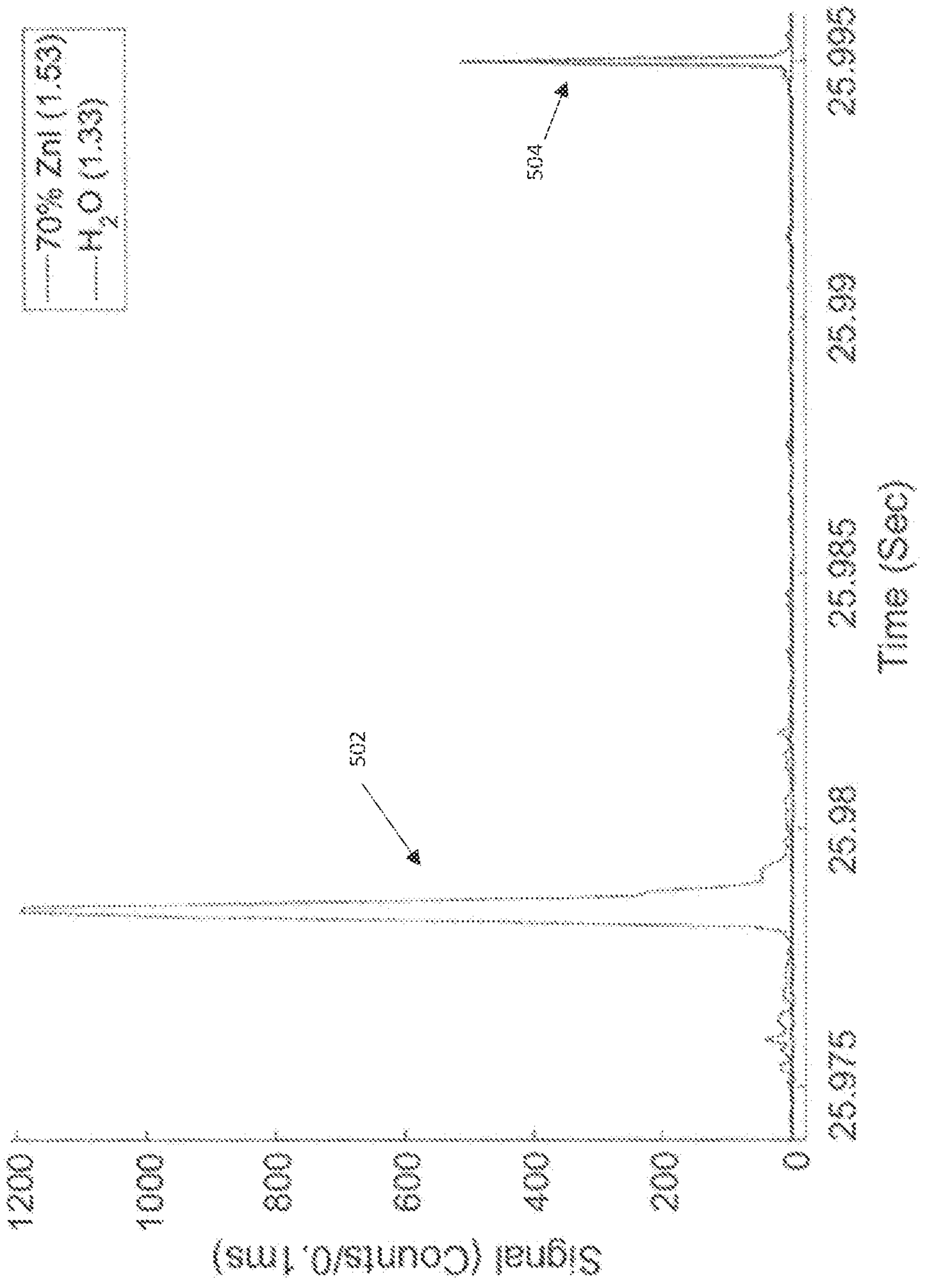
FIG. 5A shows a signal corresponding to detection of fluorescent beads in a liquid-core channel containing zinc iodide, and a signal corresponding to detection of fluorescent beads in a liquid-core channel containing water, in accordance with some embodiments.
Figure 5B:
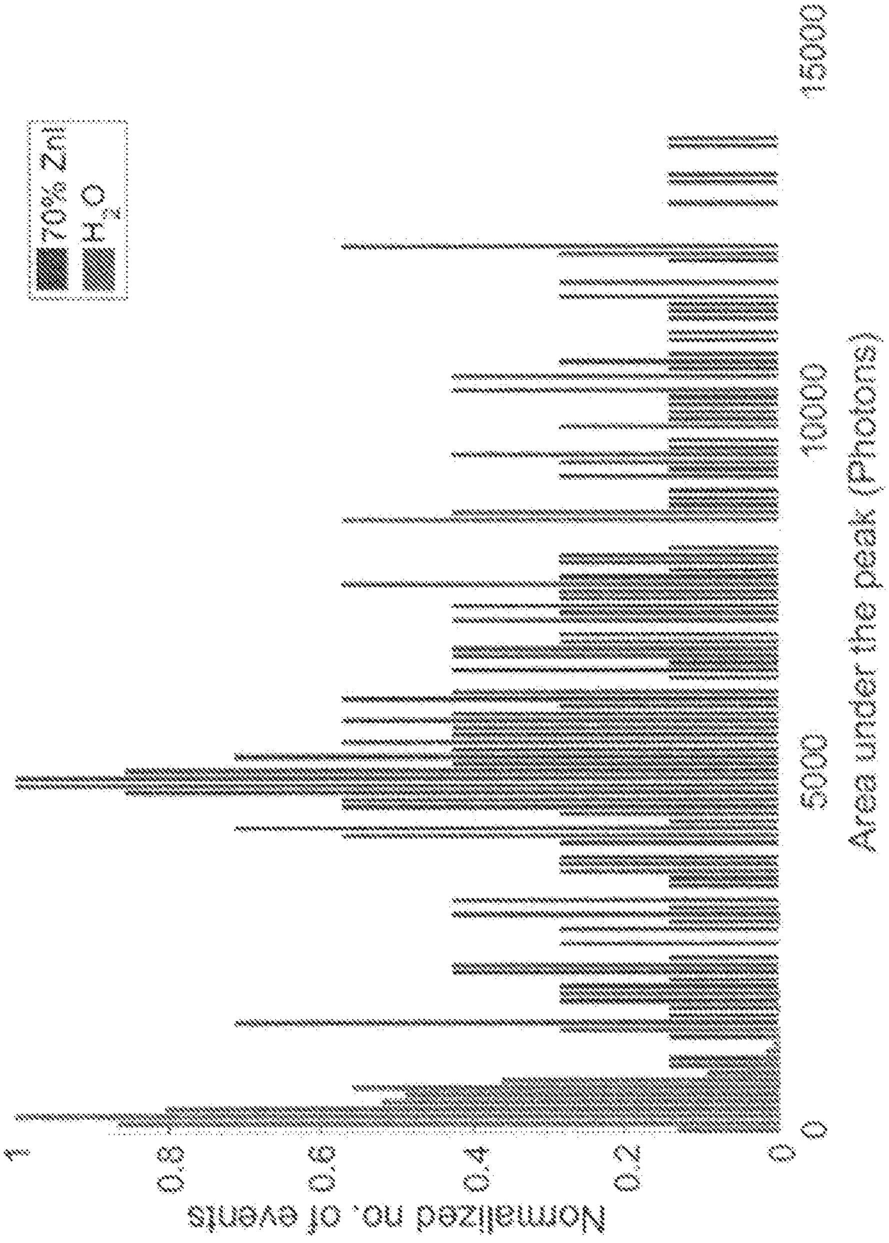
FIG. 5B shows a histogram comparing the area under the peaks of the two signals in FIG. 5A, in accordance with some embodiments.

FIGS. 5A and 5B show experimental data for emission from 2 μm fluorescent beads in liquid at a concentration of $10^7$ beads per mL, illuminated by 488 nm light in a liquid-core waveguide. In FIG. 5A, the signal 502 comprising the higher peak corresponds to detection of the beads in a liquid-core channel containing 70% zinc iodide, which has an index of refraction of 1.53 and a viscosity of 3 cP. The signal 504 comprising the lower peak corresponds to detection of the beads in a liquid-core channel having ARROW layers on a bottom side and $SiO_2$ layers (having an index of refraction of 1.46) on the other three sides, the channel containing water, which has an index of refraction of about 1.33 and a viscosity of about 1 cP. As shown in FIG. 5A, the emission spike from the fluorescent beads in the zinc iodide solution was substantially higher than the spike from the fluorescent beads in water.

FIG. 5B shows a histogram comparing the area under the peaks of signal 502 and the area under the peaks of signal 504. The lighter-colored bars at the left of the histogram correspond to the beads in water, while the darker-colored bars correspond to the beads in the zinc iodide solution.

Table 3 (below) shows data corresponding to the beads in water and to the beads in zinc iodide solution, as well as ratios comparing the data from each liquid. As shown, beads in the zinc iodide solution showed higher average peak intensity, similar background signal, and an almost 25× increase in photon collection per event as compared to beads in water.

TABLE 3

| | Average Peak (counts/0.1 ms) | Background (Counts/0.1 ms) | Signal to Noise Ratio |
|---|---|---|---|
| Water | 270 | 9 | 30 |
| 60% zinc iodide | 947 | 10 | 95 |
| $ZnI_2$:$H_2O$ | 3.5 | 1.1 | 3.2 |

High-Index Liquid-Core Waveguides with Two-Layer Cladding

In some embodiments, a liquid-core waveguide comprises a liquid core, an inner cladding layer, and an outer cladding layer. By matching the index of refraction of the liquid core to the index of refraction of the inner cladding layer, and by selecting an outer cladding layer having a lower index of refraction than both the inner cladding layer and the liquid core, a fundamental optical mode may have a non-zero field strength at the interfaces between the liquid core and the inner cladding layer, and may therefore enable efficient excitation and detection of particles located proximate to the interfaces in the liquid core. The results of this approach are shown, in one example, in FIGS. 6A-6C.

Figure 6A:
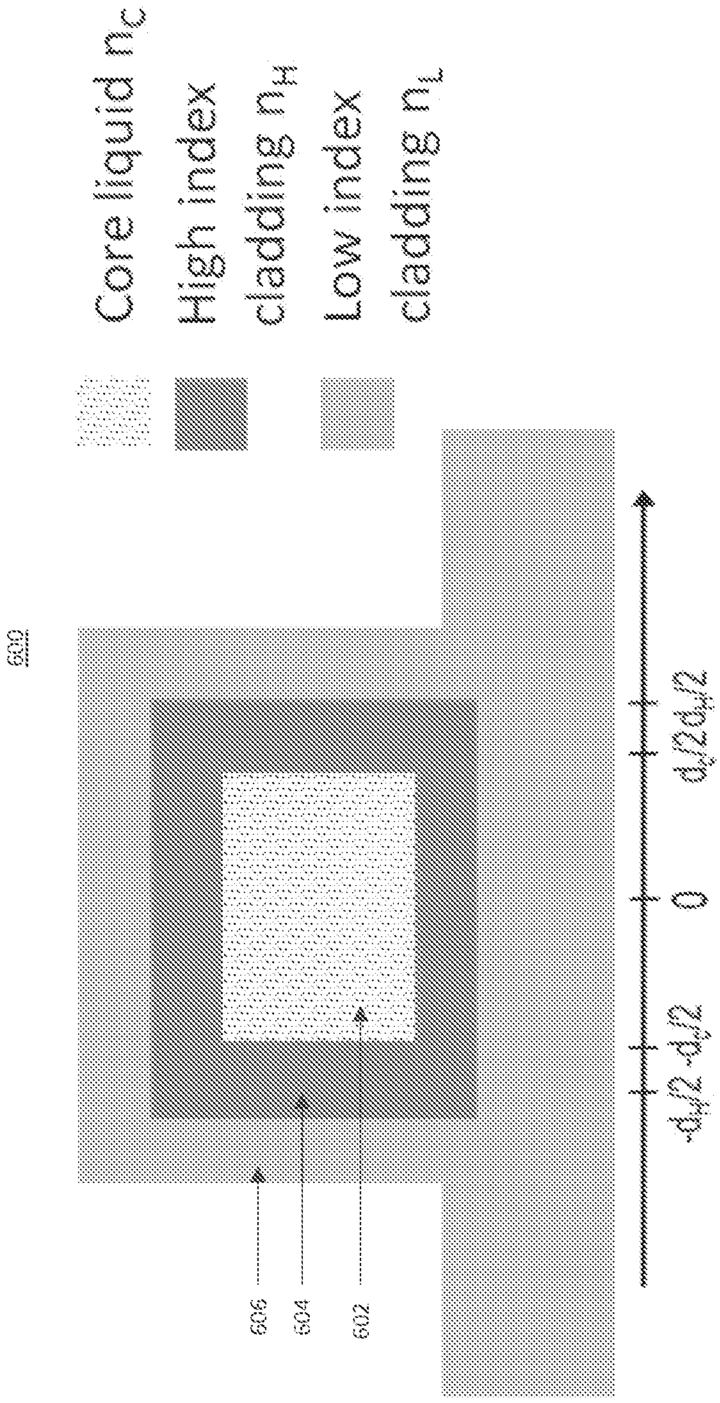
FIG. 6A shows a cross-sectional view of a liquid-core waveguide with two cladding layers, in accordance with some embodiments.

FIG. 6A shows a cross-sectional view of a liquid-core waveguide 600, in accordance with some embodiments. As shown, waveguide 600 includes liquid core 602, inner cladding 604, and outer cladding 606. In some embodiments, one or more additional claddings (e.g., other cladding layers) may also be included. In some embodiments, as described herein, an index of refraction of liquid core 602 may be matched (e.g., may be equivalent to or very similar to) an index of refraction of cladding 604, while cladding 606 may have a lower index of refraction than both cladding 604 and liquid core 602. As described herein, this arrangement may cause an electric field profile of a fundamental mode to be relatively uniform and strong across the entire width of liquid core 602.

The index of refraction of the liquid core 602 may be an index of refraction of a fluid that fills all or part of the liquid core, which may in some embodiments include zinc iodide liquid, ethylene glycol liquid, or any suitable liquid having an index of refraction that is greater than an index of refraction of cladding 606. In some embodiments, liquid-core 602 may share any one or more characteristics in common with liquid-core 202 discussed above with respect to FIG. 2. In some embodiments, the index of refraction of liquid core 602 may be greater than or equal to 1.25, 1.35, 1.45, 1.75, 2.0, or 2.25. In some embodiments, the index of refraction of liquid core 602 may be less than or equal to 1.25, 1.35, 1.45, 1.75, 2.0, or 2.25. In some embodiments, the index of refraction of liquid core 602 may be between 1.45 and 2.0.

Figure 6B:
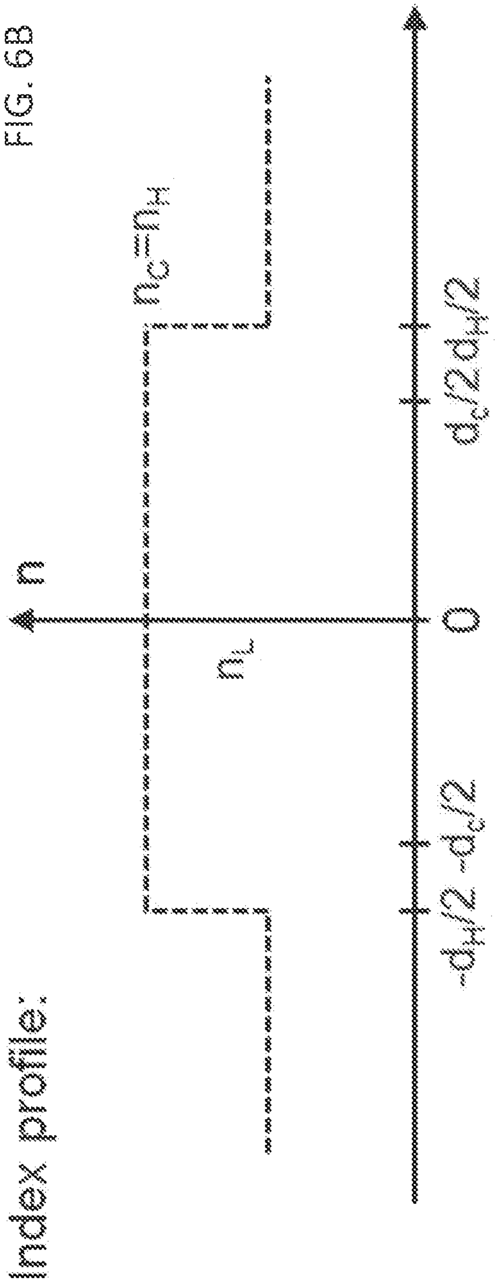
FIG. 6B shows the index of refraction profile for a liquid-core waveguide with two cladding layers, in accordance with some embodiments.

In some embodiments, the width ("$d_c$" as shown in FIG. 6B) of liquid-core 602 of liquid-core waveguide 600 may be less than or equal to 0.25 μm, 0.5 μm, 1 μm, 5 μm, 10 μm, 15 μm, 20 μm, 30 μm, or 50 μm. In some embodiments, the width of liquid-core 602 of liquid-core waveguide 600 may be greater than or equal to 0.25 μm, 0.5 μm, 1 μm, 5 μm, 10 μm, 15 μm, 20 μm, 30 μm, or 50 μm. In some embodiments, the width of liquid core 602 may be between 1 μm and 20 μm.

In some embodiments, the height of liquid core 602 may be less than or equal to 0.25 μm, 0.5 μm, 1 μm, 5 μm, 10 μm, 15 μm, or 20 μm. In some embodiments, the height of liquid core 602 may be greater than or equal to 0.25 μm, 0.5 μm, 1 μm, 5 μm, 10 μm, 15 μm, or 20 μm. In some embodiments, the height of liquid core 602 may be between 1 μm and 10 μm.

While liquid core 602 is shown in the example of FIGS. 2A and 2B as rectangular, it may in some embodiments have a square, round, semi-circular, or any suitable cross-sectional shape.

The index of refraction of cladding 604 may be an index of refraction of a solid (and/or flexible) material used to create cladding 604, which may in some embodiments include silicon dioxide, tantalum pentoxide, silicon nitride, or any suitable glass and/or oxide, PDMS, or plastic. In some embodiments, cladding 604 may share any one or more characteristics in common with cladding 204 discussed above with respect to FIG. 2. In some embodiments, the index of refraction of cladding 604 may be less than or equal to 1.2, 1.3, 1.4, 1.5, 1.6, 1.7, 1.8, 1.9, 2.0, 2.1, or 2.2. In some embodiments, the index of refraction of cladding 604 may be greater than or equal to 1.2, 1.3, 1.4, 1.5, 1.6, 1.7, 1.8, 1.9, 2.0, 2.1, or 2.2. In some embodiments, the index of refraction of cladding 204 may be between 1.4 and 2.0.

In some embodiments, the index of refraction of cladding 604 may be selected to be within +/−0.5%, +/−1%, +/−2%, +/−3%, or +/−5% of the index of refraction of liquid core 602, such that the mode may be supported continuously across both regions as shown in FIG. 6A.

In some embodiments, cladding 604 may have a thickness (($d_h$−$d_e$) as shown in FIG. 6B) of less than or equal to 0.25 μm, 0.5 μm, 1 μm, 5 μm, 10 μm, 15 μm, or 20 μm. In some embodiments, cladding 604 may have a thickness of greater than or equal to 0.25 μm, 0.5 μm, 1 μm, 5 μm, 10 μm, 15 μm, or 20 μm. In some embodiments, cladding 604 may have a thickness of between 1 μm and 10 μm.

The index of refraction of cladding 606 may be an index of refraction of a solid (and/or flexible) material used to create cladding 606, which may in some embodiments include silicon dioxide, tantalum pentoxide, silicon nitride, or any suitable glass and/or oxide, or PDMS or plastic. In some embodiments, cladding 606 may share any one or more characteristics in common with cladding 604 discussed above or with cladding 204 discussed above with respect to FIG. 2. In some embodiments, the index of refraction of cladding 606 may be less than or equal to 0.8, 0.9, 1, 1.1, 1.25, 1.5, 1.75, 1.9, 2, 2.1, or 2.2. In some embodiments, the index of refraction of cladding 606 may be greater than or equal to 0.8, 0.9, 1, 1.1, 1.25, 1.5, 1.75, 1.9, 2, 2.1, or 2.2. In some embodiments, the index of refraction of cladding 606 may be between 1 and 2.

In some embodiments, the index of refraction of cladding 606 may be selected to be at least 1%, 5%, 10%, 50%, 75%, or 100% less than the index of refraction of cladding 604.

In some embodiments, cladding 606 may have a thickness of less than or equal to 0.25 μm, 0.5 μm, 1 μm, 5 μm, 10 μm, 15 μm, or 20 μm. In some embodiments, cladding 606 may have a thickness of greater than or equal to 0.25 μm, 0.5 μm, 1 μm, 5 μm, 10 μm, 15 μm, or 20 μm. In some embodiments, cladding 606 may have a thickness of between 1 μm and 10 μm.

FIG. 6B shows the index of refraction profile for a high-index liquid-core waveguide, such as waveguide 600, with an inner cladding layer having an index of refraction that matches the index of refraction of the liquid core, in accordance with some embodiment. As shown, the index of refraction $n_c$ of the liquid core 602 may be equivalent (or similar within a predefined percentage or absolute range) to the index of refraction $n_H$ of the inner cladding layer 604. As further shown, the index of refraction $n_c$ of the liquid core and the index of refraction $n_H$ of the inner cladding layer may both be greater than the index of refraction of the outer cladding layer 606.

Figure 6C:
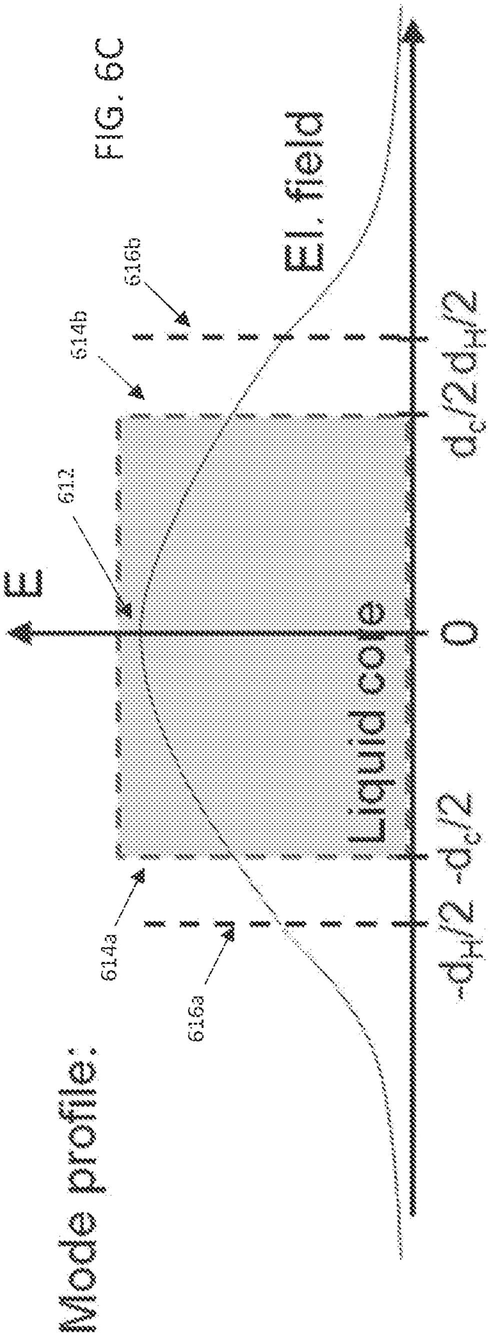
FIG. 6C shows the electric field profile for a fundamental optical mode in a liquid-core waveguide with two cladding layers, in accordance with some embodiments.

FIG. 6C shows the electric field profile for a fundamental optical mode in a high-index liquid-core waveguide such as waveguide 600, with an inner cladding layer having an index of refraction that matches the index of refraction of the liquid core, in accordance with some embodiment. As shown, the mode profile has a finite, non-zero strength at interfaces 614*a* and 614*b* between liquid-core 602 and cladding 604, due to the nature of the solutions to the Helmholtz equation. Furthermore, because the mode decays as a result of the lower index of refraction in the outer cladding layer 606 and not as a result of the index of refraction of inner cladding layer 604 (as the index of refraction of inner cladding layer 604 may be equivalent to the index of refraction of liquid core 602), the profile of the electric field of the mode across liquid core 602 may be even stronger and more stable than the profile of the electric field of the mode across liquid core 202 discussed above; that is, the mode in liquid core 202 decays more rapidly due to the index change immediately outside interfaces 214*a* and 214*b*, while the mode in liquid core 602 decays due to an index change that is spaced apart from interfaces 614*a* and 614*b*.

In some embodiments, the mode strength at interface 614*a* and/or 614*b* may be greater than or equal to 1%, 5%, 10%, 20%, 30%, 40%, 50%, 60%, 70%, 80%, 90%, or 95% of the mode strength at maximum 612 at the center of liquid core 602. In some embodiments, the mode strength at 614*a* and/or 614*b* may be less than or equal to 5%, 10%, 20%, 30%, 40%, 50%, 60%, 70%, 80%, 90%, 95%, or 99% of the mode strength at maximum 612 at the center of liquid core 602.

In some embodiments, the mode strength at interface 614*a* and/or 614*b* may be greater than or equal to 101%, 105%, 110%, 150%, 2 times, three times, or five times greater than the mode strength at interfaces 616*a* and/or 616*b* between inner cladding layer 604 and outer cladding layer 606. In some embodiments, the mode strength at interface 614*a* and/or 614*b* may be less than or equal to 105%, 110%, 150%, 2 times, three times, five times, or ten times greater than the mode strength at interfaces 616*a* and/or 616*b*.

The relative values of the field strength of the mode at maximum 612, interfaces 614*a* and/or 614*b*, and/or interfaces 616*a* and/or 616*b* may be controlled via the channel dimensions and the relative indices of the core and multiple cladding materials.

Thus, while particles in liquid core 102 near interface 114*a* or 114*b* are not excitable and/or detectable due to the weak mode strength there, particles in liquid core 602 near interface 614*a* or 614*b* may be excitable and detectable because the mode strength there may be substantially stronger due to the mode's extension into cladding 604 and due to the fact that the mode is not forced to zero at interface 614*a* or 614*b*. Furthermore, while particles in liquid core 202 near interface 214*a* or 214*b* may be excitable and detectable, particles in liquid core 602 near interface 614*a* or 614*b* may be more excitable and more detectable with more intensity because the mode in liquid core 602 does not decay due as rapidly because there is no (or very little) index change at interfaces 614*a* and/or 614*b*.

In this way, the problem discussed above of incomplete detection of target analytes may be addressed by using a high-index liquid to ensure that analytes are detectable at all parts of a liquid core. Furthermore, the problem discussed above of the difficulty of detecting targets labeled with only a single or few fluorescent dyes may be addressed because total-internal-reflection-guiding waveguides are theoretically lossless, and may therefore be fabricated to be extremely efficient (e.g., essentially lossless) in practice. In practice, the only losses may be due to fabrication imperfections, which may be addressed and minimized independently. Thus, transport of light along a channel such as one defined by waveguide 200 and/or waveguide 600 may be significantly improved as compared to leaky-mode guiding such as with waveguide 100.

Systems Using High-Index Liquid-Core Waveguides

In some embodiments for using a high-index liquid core waveguide for particle detection as described herein, all sample preparation steps may be carried out using the original matrix (e.g., blood), which is typically aqueous, and the optically active (e.g., fluorescently labeled) targets may be released into a high-index liquid immediately or shortly before detection in the hollow microchannel. In some embodiments, the targets may be released into a high-index liquid less than 1 second, 30 seconds, 1 minute, 5 minutes, 10 minutes, or 30 minutes before detection.

In some embodiments, high-index liquids that do not destroy DNA, do not denature proteins, and/or do not otherwise damage or alter biological analytes may be selected for use in high-index liquid-core waveguides.

In some embodiments, systems for particle detection using high-index liquid core waveguides may comprise one or more components for cell lysing, fluorescent labeling, target extractions, filtering of analyte fluid (e.g., to remove pieces too large for an analyte channel), sample flow control (e.g., by one or more microvalve-based components) or other sample preparation processes. In some embodiments, any one or more of these components may be disposed on a same substrate (e.g., chip) as one or more of the other components discussed herein.

In some embodiments, detection of particles on using the systems and/or techniques disclosed herein may be used to identify one or more detected particles. For example, a detected particle may be identified on the basis of its emission wavelength, its emission intensity, a detected velocity, or any other detected characteristic about the particle that may be compared to one or more databases or other known information to determine an identity of the detected particle.

In some embodiments, one or more high-index liquid-core waveguides may be disposed on a chip or on another suitable substrate. In some embodiments, a substrate or chip on which one or more high-index liquid-core waveguides are disposed may be less than 1 mm, 2 mm, 5 mm, 1 cm, 2 cm, or 3 cm in width; and may be less than 1 mm, 2 mm, 5 mm, 1 cm, 2 cm, or 3 cm in length. In some embodiments, a substrate or chip on which one or more high-index liquid-core waveguides are disposed may be greater than 1 mm, 2 mm, 5 mm, 1 cm, 2 cm, or 3 cm in width; and may be greater than 1 mm, 2 mm, 5 mm, 1 cm, 2 cm, or 3 cm in length. In some embodiments, a substrate or chip on which one or more high-index liquid-core waveguides are disposed may be between 2×2 mm and 2×2 cm.

What is claimed is:

1. A method for particle detection, the method comprising:

introducing a liquid into a hollow core of a liquid-core waveguide, prior to illuminating the one or more particles in the liquid-core waveguide;

illuminating, by a light-source, the one or more particles in the liquid-core waveguide, wherein the liquid-core waveguide is configured to support a fundamental transverse electromagnetic mode of light from the light source and comprises:

a first cladding layer having a first index of a refraction; and the hollow core extending through the waveguide and comprising the liquid inside the hollow core, wherein the liquid has a second index of refraction higher than the first index of refraction, wherein an intensity of the fundamental transverse electromagnetic mode at an outer edge of the hollow core is greater than or equal to 20% of a maximum intensity of the fundamental transverse electric mode, and wherein the waveguide is configured such that an intensity of the fundamental transverse electromagnetic mode has a non-zero value at an interface between the first cladding layer and the hollow core; and detecting, by a detector, light emitted from the one or more particles.

2. The method of claim 1, further comprising introducing the one or more particles into the liquid prior to illuminating the one or more particles.

3. The method of claim 1, wherein the first index of refraction is less than or equal to 2, 1.8, 1.6, or 1.4.

4. The method of claim 1, wherein the second index of refraction is greater than or equal to 2, 1.8, 1.6, or 1.4.

5. The method of claim 1, wherein the waveguide is configured to transmit light from the light source via total internal reflection.

6. The method of claim 1, wherein the hollow core is less than or equal to 20 μm, 10 μm, 5 μm, or 1 μm in width.

7. The method of claim 1, wherein the first cladding layer is less than or equal to 10 μm, 5 μm, 1 μm, 0.5 μm, or 0.1 μm in thickness.

8. The method of claim 1, wherein the first cladding layer comprises one or more of silicon dioxide, tantalum pentoxide, or silicon nitride, PDMS, or one or more plastics.

9. The method of claim 1, wherein the liquid-core waveguide is disposed on a substrate less than or equal to 2 cm, 1 cm, 5 mm, or 2 mm in width and less than or equal to 2 cm, 1 cm, 5 mm, or 2 mm in length.

10. The method of claim 9, wherein the light source is disposed on the substrate.

11. The method of claim 9, wherein the detector is disposed on the substrate.

12. The method of claim 1, wherein the liquid comprises one or more of zinc iodide, ethylene glycol, or sodium iodide.

13. The method of claim 1, wherein the one or more particles comprise one or more of molecules, biomarkers, nucleic acids, proteins, and DNA.

14. The method of claim 1, wherein the liquid-core waveguide comprises:

a second cladding layer between the first cladding layer and the hollow core, wherein the second cladding layer has a third index of refraction that is the same as the second index of refraction or is within +/−10%, +/−5%, +/−2%, +/−1%, +/−0.5%, +/−0.1%, or +/−0.01% of the second index of refraction.

15. The method of claim 14, wherein the waveguide is configured such that an intensity of the fundamental transverse electromagnetic mode at an interface between the second cladding layer and the hollow core is greater than or equal to 20%, 30%, 40%, 50%, 60%, 70%, 80%, 90%, or 99% of a maximum intensity of the fundamental transverse electric mode.

16. The method of claim 14, wherein the second cladding layer is less than or equal to 1 μm, 0.5 μm, or 0.1 μm in thickness.

17. The method of claim 14, wherein the second cladding layer comprises one or more of silicon dioxide, tantalum pentoxide, silicon nitride, PDMS, or plastic.

18. The method of claim 1, further comprising identifying one or more of the detected particles on the basis of a detected characteristic.

19. A particle detection system comprising:

a light source configured to excite one or more particles;

a liquid-core waveguide configured to support a fundamental transverse electromagnetic mode of light from the light source and comprising:

a first cladding layer having a first index of refraction;

a hollow core extending through the waveguide and comprising a liquid inside the hollow core, wherein:

the liquid has a second index of refraction higher than the first index of refraction, wherein an intensity of the fundamental transverse electromagnetic mode at an outer edge of the hollow core is greater than or equal to 20% of a maximum intensity of the fundamental transverse electric mode, and wherein the waveguide is configured such that an intensity of the fundamental transverse electromagnetic mode has a non-zero value at an interface between the first cladding layer and the hollow core; and the liquid comprises the one or more particles, wherein the one or more particles are molecules in solution in the liquid or are solids suspended in the liquid; and a detector configured to detect light emitted from the one or more particles.

20. The particle detection system of claim 19, comprising a second cladding layer between the first cladding layer and the hollow core, wherein the second cladding layer has a third index of refraction that is the same as the second index of refraction or is within +/−10%, +/−5%, +/−2%, +/−1%, +/−0.5%, +/−0.1%, or +/−0.01% of the second index of refraction.

21. The particle detection system of claim 19, wherein the liquid-core waveguide is disposed on a substrate less than or equal to 2 cm, 1 cm, 5 mm, or 2 mm in width and less than or equal to 2 cm, 1 cm, 5 mm, or 2 mm in length.

22. The particle detection system of claim 21, wherein the light source is disposed on the substrate.

23. The particle detection system of claim 21, wherein the detector is disposed on the substrate.

* * * * *